US012601305B2

(12) United States Patent
Ohrt et al.

(10) Patent No.: US 12,601,305 B2
(45) Date of Patent: Apr. 14, 2026

(54) FUEL SUPPLY SYSTEM FOR SUPPLYING A FUEL EMULSION TO A FUEL INJECTION SYSTEM OF AN ENGINE

(71) Applicant: Caterpillar Motoren GmbH & Co. KG, Kiel (DE)

(72) Inventors: Ole Ohrt, Hohenwestedt (DE); Robert Graumueller, Kiel (DE); Thorsten Tuexen, Gettorf (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 18/846,169

(22) PCT Filed: Mar. 31, 2023

(86) PCT No.: PCT/EP2023/025149
§ 371 (c)(1),
(2) Date: Sep. 11, 2024

(87) PCT Pub. No.: WO2023/193949
PCT Pub. Date: Oct. 12, 2023

(65) Prior Publication Data

US 2025/0188882 A1 Jun. 12, 2025

(30) Foreign Application Priority Data

Apr. 6, 2022 (GB) ...................................... 2205064

(51) Int. Cl.
*F02D 19/08* (2006.01)

(52) U.S. Cl.
CPC ......... *F02D 19/087* (2013.01); *F02D 19/082* (2013.01); *F02D 19/085* (2013.01)

(58) Field of Classification Search
CPC .... F02D 19/087; F02D 19/082; F02D 19/085; F02D 19/0665; F02D 19/0668;
(Continued)

(56) References Cited

U.S. PATENT DOCUMENTS 5,336,396 A 8/1994 Shetley
2007/0175459 A1* 8/2007 Williams ............ F02D 41/0025 123/515

(Continued)

FOREIGN PATENT DOCUMENTS

AU 4425579 A 8/1980
CN 1278034 C 10/2006

(Continued)

OTHER PUBLICATIONS

Great Britain Search Report related to Application No. 2205064.5 reported on Oct. 3, 2022.

(Continued)

*Primary Examiner* — Grant Moubry

(57) ABSTRACT

The present invention refers to a fuel supply system of an internal combustion engine, in particular of a marine diesel engine, for supplying a fuel emulsion to a fuel injection system of the engine. The fuel supply system includes at least one actuated blending unit configured to blend a primary fuel and a secondary fuel to provide the fuel emulsion prior to being supplied to the fuel injection system.

13 Claims, 2 Drawing Sheets

(58) Field of Classification Search
CPC ............... F02D 19/0694; F02D 19/081; F02D 19/0642; F02D 19/08; F02D 41/0025; F02M 43/00; F02M 37/0064
See application file for complete search history.

(56) References Cited

U.S. PATENT DOCUMENTS

| | | | | |
|---|---|---|---|---|
| 2008/0223344 | A1* | 9/2008 | Suzuki | F02D 19/0671 123/3 |
| 2009/0320786 | A1* | 12/2009 | Fisher | F02M 21/0287 123/304 |
| 2009/0320789 | A1* | 12/2009 | Lund | F02D 19/0665 123/299 |
| 2010/0288211 | A1 | 11/2010 | Agosta | |
| 2022/0025826 | A1* | 1/2022 | Gallagher | F02D 41/021 |

FOREIGN PATENT DOCUMENTS

| | | | | |
|---|---|---|---|---|
| CN | 101294109 | A | 10/2008 | |
| CN | 102322362 | A | 1/2012 | |
| CN | 101955814 | B | 6/2013 | |
| CN | 103205287 | B | 11/2014 | |
| CN | 210068340 | U | 2/2020 | |
| CN | 211777765 | U | 10/2020 | |
| CN | 213743762 | U | 7/2021 | |
| CN | 113217239 | A | 8/2021 | |
| DK | 201770463 | A1 * | 2/2019 | F02M 25/03 |
| JP | H11159361 | A | 6/1999 | |
| JP | 2007077930 | A | 3/2007 | |
| WO | 2007031848 | A2 | 3/2007 | |
| WO | 2008141390 | A1 | 11/2008 | |
| WO | WO-2010121306 | A1 * | 10/2010 | F02D 19/0647 |
| WO | 2011041705 | A1 | 4/2011 | |

OTHER PUBLICATIONS

International Search Report related to Application No. PCT/EP2023/025149 reported on Jul. 24, 2023.

* cited by examiner

FUEL SUPPLY SYSTEM FOR SUPPLYING A FUEL EMULSION TO A FUEL INJECTION SYSTEM OF AN ENGINE

CROSS-REFERENCE TO RELATED APPLICATION

This Application is a 35 USC $371 US National Stage filing of International Application No. PCT/EP2023/025149 filed on Mar. 31, 2023 which claims priority under the Great Britain Patent Application No. 2205064.5 filed on Apr. 6, 2022.

TECHNICAL FIELD

The present invention refers to a fuel supply system for supplying a fuel emulsion to a fuel injection system of an internal combustion engine, in particular of a marine engine.

TECHNOLOGICAL BACKGROUND

Due to environmental regulations, marine vessels, such as ferries, cruise ships or cargo ships, are subjected to strict restrictions regarding emissions. Recent regulations introduced by the International Maritime Organization (IMO), for example, aim on reducing greenhouse gas emissions of ships. For verifying their compliance, the IMO has introduced different measures to determine energy efficiency of ships, such as the Energy Efficiency Existing Ship Index (EEXI) and the Energy Efficiency Design Index (EEDI).

To reduce greenhouse gas emissions and thus to fulfill regulatory requirements, it is known to operate marine engines on alternative fuels, such as liquified petroleum gas, compressed natural gas, liquid natural gas, biomethane, ethanol, methanol and hydrogen. Techniques are known according to which a primary fuel, such as diesel, of marine engines is mixed and thus combusted together with alternative fuels. For doing so, it is known to separately introduce the primary and alternative fuel into cylinders of the engine. This approach, however, requires injection mechanisms for both the primary fuel and the alternative fuel.

According to another approach, it is known to mix the primary fuel and the alternative fuel together prior to being injected to the cylinders of the engine. However, the primary fuel and the alternative fuel may be two normally immiscible liquids which, when mixed together, form an emulsion. The phase segregation in such an emulsion may affect the combustion process in the engine and may thus result in unfavorable operating conditions.

SUMMARY OF THE INVENTION

Starting from the prior art, it is an objective to provide an improved fuel supply system which in particular enables an internal combustion engine to efficiently run on a fuel mixture comprising two normally immiscible liquid fuels.

This objective is solved by the subject matter of the independent claim. Preferred embodiments are set forth in the present specification, the Figures as well as the dependent claims.

Accordingly, a fuel supply system of an internal combustion engine, in particular of a marine diesel engine, is provided. The fuel supply system is intended for supplying a fuel emulsion to a fuel injection system of the engine and, for doing so, comprises at least one actuated blending unit configured to blend a primary fuel and a secondary fuel to provide the fuel emulsion prior to being supplied to the fuel injection system.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
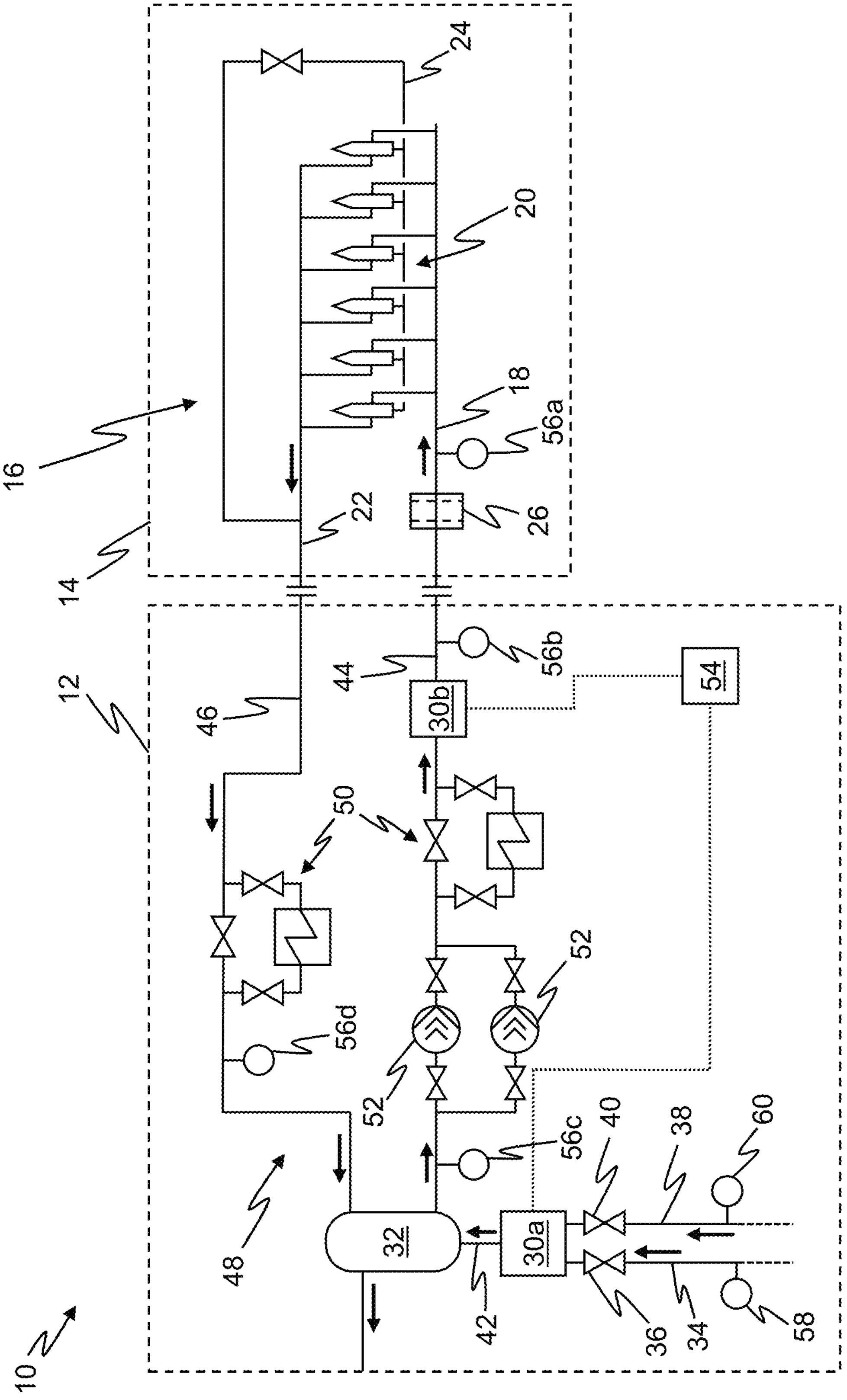
FIG. 1 schematically shows a fuel supply system of an internal combustion engine.

In the following, the invention will be explained in more detail with reference to the accompanying Figures. In the Figures, like elements are denoted by identical reference numerals and repeated description thereof may be omitted in order to avoid redundancies.

FIG. 1 depicts an internal combustion engine system 10 of a vessel including a fuel supply system 12 and an internal combustion engine 14, referred to as “the engine” in the following. In the shown configuration, the engine 14 is a medium speed combustion engine provided in the form of a marine diesel engine. However, the present invention is not limited to this specific application and may be applied in different technical fields and applications, such as in internal combustion engine systems used in power plants or vehicles as a main or auxiliary engine or the like. Further, it is apparent to the skilled person that the suggested fuel supply system 12 is not limited to be used in combination with the engine 14 of the shown configuration, but rather may be applied to any suitable internal combustion engines, such as gasoline engines.

In the shown configuration, the engine 14 includes a plurality of cylinders and a corresponding number of piston assemblies disposed therein (not shown). The engine 14 may include any number of cylinders which may be arranged according an “in-line” configuration, a “V-configuration”, or any other known cylinder configuration. Each cylinder is provided with a combustion chamber delimited by a cylinder wall and a piston accommodated therein. During operation of the engine 14, each one of the combustion chambers is supplied with a fuel medium and intake air which are to be ignited therein so as to produce high-temperature and high-pressure gases, thereby applying forces to and thus axially move the associated pistons. In this way, chemical energy is transformed into mechanical energy.

For supplying the fuel medium into the combustion chambers, the engine 14 comprises a fuel injection system 16 configured for injecting the fuel medium, in particular a liquid fuel medium into the respective combustion chambers of the engine 14. The fuel injection system 16 will be further specified below with reference to FIG. 1.

For supplying intake air into the combustion chambers, the engine further comprises an air intake system (not shown) comprising a plurality of air intake valves opening into the respective combustion chambers and configured for selectively directing intake air into the combustion chambers.

Further, for expelling combustion gases from the combustion chambers, i.e. after combustion of the fuel mixture took place, the engine 14 further comprises an exhaust gas system (not shown) comprising a plurality of exhaust gas valves configured for selectively expelling exhaust gases from the combustion chambers.

The fuel injection system 16 comprises a fuel receiving line 18 which is configured to receive a fuel medium from the fuel supply system 12. Upon receiving the fuel medium, the fuel receiving line 18 is configured to guide the received fuel medium to a plurality of injection pumps 20 which pressurize and inject the fuel medium into the respective combustion chambers of the engine 14. The number of injection pumps 20 may correspond to the number of cylinders of the engine 14. The fuel injection pumps 20 are connected to a fuel return line 22 via a fuel bypass line 24 to direct unspent fuel, i.e. fuel passing the injection pumps 20 without being injected into the combustion chambers, to the fuel supply system 12. Alternatively, instead of the injection pumps 20, a common rail and an associated high pressure pump may be used to supply pressurized fuel medium to the combustion chambers via corresponding injectors. The fuel injection system 16 further comprises a filter 26 installed in the fuel receiving line 18 to filter contaminants from the fuel medium supplied to the fuel injection system 16 prior to being directed to the fuel pumps 20.

The basic structure and function of such an engine 14 and its components, in particular the air intake system, the exhaust gas system and the fuel injection system 16, are well known to a person skilled in the art and are thus not further specified. Rather, characteristics of the combustion engine system 10, in particularly the fuel supply system 12, which are interlinked with the present invention are addressed in the following.

The fuel supply system 12 is intended and configured for supplying a fuel emulsion to the fuel injection system 16 of the engine 14. In the context of the present disclosure, the term "fuel emulsion" refers to a fuel medium provided as a mixture of two or more liquid fuels that are normally not soluble or miscible with one another owing to liquid-liquid phase separation.

The fuel emulsion comprises or consists of a primary fuel, also referred to as primary fuel medium, and a secondary fuel, also referred to as secondary fuel medium. In the fuel emulsion, the primary fuel may constitute a continuous phase and the secondary fuel may constitute a dispersed phase, or vice versa. In other words, in the fuel emulsion, the secondary fuel may be dispersed in the continuous phase formed by the primary fuel, or vice versa. The primary fuel and the secondary fuel may be in a liquid phase, in particular when being supplied to the fuel supply system 12.

In the shown configuration, the primary fuel is a fuel oil or diesel fuel, in particular marine diesel oil, more particularly marine diesel oil according to the standard ISO 8217. In an alternative configuration, the primary fuel may be gasoline.

The secondary fuel may be at least one of methanol, ammoniac, liquid natural gas and hydrogen methanol. In the shown configuration, the secondary fuel comprises or is composed of methanol.

By providing the fuel emulsion, the secondary fuel, particularly methanol, substitutes a part of the primary fuel, particularly marine diesel oil. As the combustion of the secondary fuel, i.e. methanol, generates less greenhouse gases, in particular less carbon dioxide, compared to the combustion of the primary fuel, i.e. marine diesel oil, the overall pollutant emission of the engine may be reduced when running on the fuel emulsion instead of exclusively on the primary oil. In this way, the suggested fuel supply system enables to reduce EEIX or EEDX of the vessel being equipped with the combustion engine system 10.

Specifically, the fuel emulsion, in particular when being supplied to the fuel injection system 16, may comprise a mass or volume fraction of up to 50% of the secondary fuel. For example the fuel emulsion may comprise a mass fraction of the secondary fuel of substantially 40% or substantially 30% or substantially 20%.

In the context of the present invention, it has been found that, directing a fuel emulsion into combustion chambers of an engine may affect combustion properties and thus operation of the engine. This may particularly be the case when the fuel emulsion is not properly blended before being injected into the cylinders of the engine, thereby possibly leading to unstable and, among cylinders, to uneven combustion phenomena.

The suggested fuel supply system 12 is equipped with two actuated blending units 30*a,b* configured to blend the primary fuel and the secondary fuel to provide or generate the fuel emulsion prior to being supplied to the fuel injection system 16. In an alternative embodiment, the fuel supply system may comprise only one of the two blending units 30*a,b*. By being provided with at least one of the two actuated blending units 30*a,b*, the suggested fuel supply system 12 may contribute to preventing the engine 14 from being subjected to the above described undesired combustion phenomena or to counteract these combustion phenomena.

In the following, the structural and functional configuration of a blending unit 30 is described which may apply to any one or both of the two blending units 30*a,b* employed in the fuel supply system 12. In the context of the present disclosure, the term "actuated blending unit" refers to a blending unit which is power-operated, i.e. which is actuated by a power source, in particular an additional power source. As such, the blending unit 30 may comprise a component, in particular an actuator, configured to transform an input power into an output power used to blend the fuel emulsion. The input power may be provided electrically, pneumatically, hydraulically, mechanically, i.e. in the form of mechanical energy, etc. In the shown configuration, the blending unit 30 may be an electrically driven blending unit having an electrically driven actuator, such as an electric motor, which actuates blending elements of the blending unit 30. Alternatively, the blending unit 30 may be a pneumatically or hydraulically or mechanically driven blending unit. That is, an actuator of the blending unit for actuating the blending elements may be pneumatically or hydraulically or mechanically driven.

In one configuration, the blending unit 30 may be provided in the form of a shearing mixer, also referred to as high-shear mixer. The shearing mixer may comprise a rotor or impeller or a series of such rotors or impellers, that is/are rotatably actuated by an actuator, in particular an electric motor, to rotate relative to one or more stationary components, also referred to as stator. The rotor and stator are arranged in a mixing chamber through which the primary and secondary fuel to be blended is guided. As such, the mixing chamber of the shearing mixer forms a pipe or flow passaged in the fuel supply system 12.

Alternatively, the blending unit 30 may be provided in the form of an ultrasonic mixer, also referred to as an ultrasonic homogenizer. The ultrasonic mixer comprises an ultrasonic transducer which is configured to generate ultrasonic waves directed towards a mixing chamber of the blending unit. Upon being guided through the mixing chamber, the primary and secondary fuels are subjected to the ultrasonic waves which induce blending of the fuel components.

Alternatively, the blending unit 30 may be provided in the form of the above-described shearing mixer which, in addition, is equipped with an ultrasonic transducer. In this configuration, the ultrasonic transducer may be configured to direct ultrasonic waves to the primary and secondary fuel upon or before or after passing the rotor and stator.

Further, the blending unit 30 is configured to provide or process the fuel emulsion, in particular to process the primary and secondary fuels, such that, upon being discharged from the blending unit, the fuel emulsion has a mean droplet size of dispersed phase which is smaller than 100 μm. In other words, upon flowing through the blending unit 30, the primary and secondary fuel are blended such that at an outlet of the blending unit 30 the fuel emulsion has a mean droplet size of dispersed phase, in particular formed by the secondary fuel, which is smaller than 100 μm, for example which may be about 10 μm. In the context of the present invention, it has been found that, when applying the suggested fuel supply system 12 in marine engine applications, in particular in medium speed engine systems, generating a fuel emulsion having a mean droplet size of dispersed phase which is smaller than 100 μm in the fuel supply system 12 may enable to provide favorable combustion conditions during operation of the engine 14. As to substance, emulsions in general are instable. That is, their properties change over time and due to external influences. This instability may result in an increasing mean droplet size of the dispersed phase of the fuel emulsion when being guided through the fuel supply system 12 and the fuel injection system 16. However, by providing the blending unit 30 which generates the fuel emulsion having the mean droplet size of dispersed phase which is smaller than 100 μm, it may be ensured that the property, in particular the mean droplet size of dispersed phase, of the fuel emulsion injected into the combustion chambers of the engine 14 allows for stable combustion conditions and thus of proper operation of the engine 14.

Figure 2:
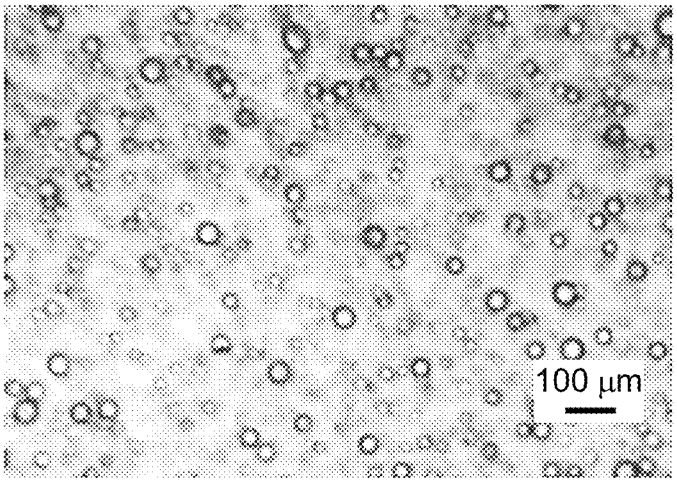
FIG. 2 shows a video-microscopy image of a sample of a fuel emulsion provided by the fuel supply system.
Figure 3:
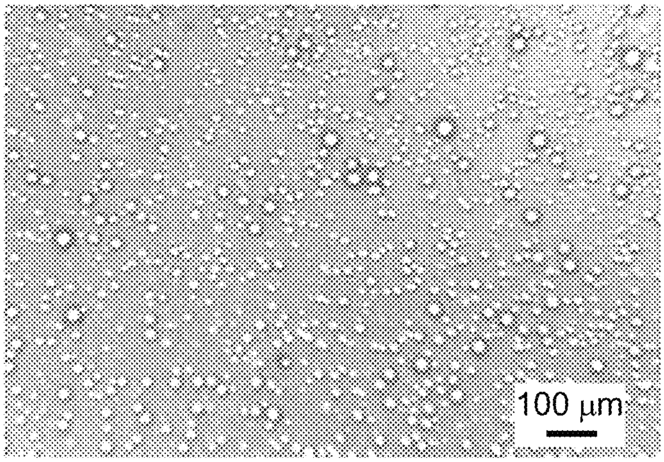
FIG. 3 shows a video-microscopy image of another sample of a fuel emulsion provided by the fuel supply system.

For validating proper function of the blending unit 30, the fuel emulsion generated by the blending unit 30 may be analyzed using video-microscopy. For doing so, a sample of the generated fuel emulsion may be removed, for example at an outlet of the blending unit 30 or at an outlet of the fuel supply system 12. Thereafter, an optical electron microscope accompanied with a charge-coupled device video camera may be used to analyze the fuel emulsion and to determine that a mean droplet size of the dispersed phase is smaller than a predetermined value, e.g., smaller than 100 μm. FIGS. 2 and 3 show exemplary images recorded by the video camera. Specifically, FIG. 2 depicts an image of a first sample of the fuel emulsion which has passed the blending unit 30 when being operated in a first operating mode and FIG. 3 depicts an image of a second sample of the fuel emulsion which has passed the blending unit 30 when being operated in a second operating mode. The second operating mode is an operating mode in which the blending unit 30 is operated with more power, i.e. at higher input and output power, compared to the first operating mode. Thus, for adapting the property of the fuel emulsion, the operational mode or operational condition of the blending unit 30, in particular the input and output power of the blending unit 30, may be varied.

In the following, the structural configuration of the fuel supply system 12 is further specified with reference to FIG. 1.

As set forth above, the fuel supply system 12 comprises two blending units 30*a,b*. A first blending unit 30*a* is provided to direct the emulsion fuel into a mixing tank 32. In other words, the first blending unit 30*a* is installed upstream of the mixing tank 32. In the context of the present disclosure, the terms "upstream" and "downstream" refer to a flow direction of the fuel emulsion through the fuel supply system 12.

The first blending unit 30*a* comprises a first inlet configured to receive the primary fuel, in particular exclusively the primary fuel. As such, the first inlet is fluid-communicatively connected to a primary fuel supply line 34 via which the primary fuel, in particular exclusively the primary fuel, is selectively supplied to the first blending unit 30*a*. The primary fuel supply line 34 may connect a primary fuel storage tank (not shown) to the first blending unit 30*a*. The primary fuel storage tank may be configured to store the primary fuel. A storage capacity of the he primary fuel storage tank may be greater, in particular substantially greater, than a storage capacity of the mixing tank 32. For selectively supplying the primary fuel to the first blending unit 30*a*, a primary fuel supply valve 36 is installed in the primary fuel supply line 34.

Further, the first blending unit 30*a* comprises a second inlet configured to receive the secondary fuel, in particular exclusively the secondary fuel. As such, the second inlet is fluid-communicatively connected to a secondary fuel supply line 38 via which the secondary fuel, in particular exclusively the secondary fuel, is selectively supplied to the first blending unit 30*a*. The secondary fuel supply line 38 may connect a secondary fuel storage tank (not shown) to the first blending unit 30*a*. The secondary fuel storage tank may be configured to store the secondary fuel. A storage capacity of the he secondary fuel storage tank may be greater, in particular substantially greater, than a storage capacity of the mixing tank 32. For selectively supplying the secondary fuel to the first blending unit 30*a*, a secondary fuel supply valve 40 is installed in the secondary fuel supply line 38.

Still further, the first blending unit 30*a* comprises an outlet configured to direct the fuel emulsion generated by the first blending 30*a* unit into the mixing tank 32. The outlet is connected, in particular directly connected to an input of the mixing tank 32 via a connecting line 42.

The fuel supply system 12 further comprises a second blending unit 30*b* which is installed downstream of the mixing tank 32. In the shown configuration, the second blending unit 30*b* is optional. Specifically, the fuel supply system 12 comprises a fuel emulsion supply line 44 which connects the mixing tank 32, in particular an outlet of the mixing tank 32, to the fuel receiving line 18 of the fuel injection system 16. The second blending unit 30*b* is installed in the fuel emulsion supply line 44. Compared to the first blending unit 30*a*, to which the primary and secondary fuels are supplied separately via two inlets, the second blending unit 30*b* comprises one inlet via which the emulsion fuel discharge from the mixing tank 32 is received. In other words, the second blending unit 30*b* comprises the inlet for receiving the fuel emulsion from the mixing tank 32 and the outlet configured to direct the fuel emulsion after being processed in the second blending unit 30*b* to the fuel injection system 16 of the engine 14. By this configuration, the fuel emulsion may be blended in two stages. The emulsion fuel is guided through the second blending unit 30*b* and thereby processed to provide finer dispersions in the fuel emulsion. In this configuration, an outlet of the second blending unit 30*b* is connected to an inlet of the fuel injection system 16 via the fuel emulsion supply line 44. Thus, fuel emulsion guided through the fuel emulsion supply line 44 is directed to the fuel receiving line 18 of the fuel injection system 16.

The fuel supply system 12 further comprises a fuel emulsion recirculation line 46 which is connected to an outlet of the fuel return line 22 of the fuel injection system 16 and which opens into a second inlet of the mixing tank 32. By such a configuration, the fuel supply system 12 provides or comprises a fuel emulsion circuit 48 configured for circulating the fuel emulsion through the fuel supply system 12 and the fuel injection system 16. In this way, unspent fuel emulsion, i.e. fuel emulsion which is guided through the fuel injection system 16 but not injected, can be redirected into the mixing tank 32. It has been found that recirculating the fuel emulsion through the fuel supply system 12 and the fuel injection system 16 may contribute to an improved stability of the fuel emulsion, i.e. may effectively counteract changes in physiochemical properties of the fuel emulsion over time. The fuel emulsion circuit 48 is constituted by, i.e. comprises, the fuel emulsion recirculation line 46 configured to receive unspent fuel emulsion form the fuel injection system 16 and the fuel emulsion supply line 44 configured for supplying the fuel emulsion to the fuel injection system 16.

The fuel supply system 12 optionally comprises one or more heat exchanger units 50, in particular cooler units, which may be installed in the fuel emulsion recirculation line 46 and/or the fuel emulsion supply line 44. Specifically, the heat exchanger unit 50 may comprise one heat exchanger or a plurality of heat exchangers connected in series. The heat exchanger units 50 may be installed in the fuel emulsion recirculation line 46 and/or the fuel emulsion supply line 44 such that the fuel emulsion may be selectively guided through or bypass the heat exchanger unit 50 as indicated in FIG. 1 by bypass lines and corresponding valves.

Further, in the shown configuration, the fuel supply system 12 comprises two circulation pumps 52 installed in the fuel emulsion supply line 44, in particular downstream of the mixing tank 32 and upstream of the second blending unit 30*b*. The circulation pumps 52 are configured to selectively subject the fuel emulsion flowing therethrough to a pressure difference to set a desired flow, for example having a desired flow velocity, through the fuel emulsion circuit 48. It should be noted that, while two circulation pumps 52 disposed in parallel are provided in the shown configuration, in other configurations, more or less than two circulation pumps may be provided.

Further, the fuel supply system 12 comprises a control unit 54 configured to control operation of the blending units 30*a,b*. Specifically, the control unit 54 is configured to selectively control input power and thus also the output power of the blending units 30*a,b*, respectively. For doing so, the control unit 54 is connected to the first and second blending unit 30*a,b* via signaling lines, as indicated by dotted lines in FIG. 1. More specifically, the control unit 54 may be configured to control operation of the blending unit's actuators so as to set a desired output power thereof. In this way, a blending degree, i.e. how fine dispersion in the fuel emulsion is to be set, can be controlled.

Optionally, one or more sensor units 56 may be provided. In the shown configuration four sensor units 56*a-d* are installed at different positions as depicted in FIG. 1. It is noted that each sensor unit 56*a-d* is optional and that more than one sensor unit 56*a-d* may be provided. The sensor units 56*a-d* may be configured to determine at least one physical or chemical characteristic of the fuel emulsion. Specifically the physical or chemical characteristic may be indicative of or may be at least one of density, viscosity, dielectricity, temperature, pressure, flow velocity, mass fraction of the secondary fuel and volume fraction of the secondary fuel.

A first sensor unit 56*a* may be installed in the fuel injection system 16 between the filter 26 and the injection pumps 20. A second sensor unit 56*b* may be arranged downstream of the second blending unit 30*b* and upstream of the fuel injection system 16 or the filter 26. A third sensor unit 56*c* may be installed in the fuel emulsion supply line 44, in particular downstream of the mixing tank 32 and upstream of the circulation pumps 52. A fourth sensor unit 56*d* may be installed in the fuel emulsion recirculation line 46, in particular upstream of the mixing tank and downstream of the heat exchanger unit 50.

A fifth sensor unit 58 may be installed in the primary fuel supply line 34. The fifth sensor unit 58 may be configured to determine at least one characteristic being indicative of or being a mass flow, flow velocity, pressure and temperature of the primary fuel flowing therethrough.

A sixth sensor unit 60 may be installed in the secondary fuel supply line 38. The sixth sensor unit 60 may be configured to determine at least one characteristic being indicative of or being a mass flow, flow velocity, pressure and temperature of the primary fuel flowing therethrough.

The control unit 54 may be configured to control operation of the at least one blending unit 30*a,b*, respectively, in particular an input and/or output power thereof, in dependence on the at least one characteristic determined by one or more of the first to sixth sensor unit 56*a-d*, 58, 60. Further, the control unit 54 may be configured to control, in dependence on the characteristic determined by the first to sixth sensor unit 56*a-d*, 58, 60, the supply of the primary fuel via the primary fuel supply line 34 and the supply of the secondary fuel via the secondary fuel supply line 38. For doing so, the control unit 54 may be configured to control operation of the primary fuel supply valve 36 and the secondary fuel supply valve 40. In this way, the control unit 54 is enabled to set a desired composition of the fuel emulsion, particularly a desired mass fraction of the secondary fuel in the fuel emulsion.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention. This particularly applies in view of the technical features described in the following.

A fuel supply system of an internal combustion engine, in particular of a marine diesel engine, may be provided for supplying a fuel emulsion to a fuel injection system of the engine, including at least one actuated blending unit configured to blend a primary fuel and a secondary fuel to provide the fuel emulsion prior to being supplied to the fuel injection system. The primary fuel may be fuel oil or diesel fuel. Alternatively or additionally, the secondary fuel may be at least one of methanol, ammoniac, liquid natural gas and hydrogen. For example, the secondary fuel may be methanol.

The fuel emulsion provided by the fuel supply system, in particular by the blending unit, may have a mass fraction of up to 50% of the secondary fuel, for example 40% or substantially 40% of the secondary fuel.

In a further development, the blending unit may comprises an electrically driven actuator. Specifically, the blending unit may be a shearing mixer or an ultrasonic mixer or a combination thereof. The blending unit may be configured to provide or process the fuel emulsion such that, upon being discharged from the blending unit, the fuel emulsion has a mean droplet size of dispersed phase which is smaller than 100 μm.

Alternatively or additionally, the fuel supply system may comprise a primary fuel supply line for selectively supplying the primary fuel into the blending unit, in particular into a first inlet of the blending unit, and a secondary fuel supply line for selectively supplying the secondary fuel into the blending unit, in particular into a second inlet of the blending unit.

Alternatively or additionally, the fuel supply system may comprise a mixing tank configured for receiving and storing the fuel emulsion, wherein the blending unit is installed upstream or downstream of the mixing tank.

Alternatively, the fuel supply system may comprise a first blending unit installed upstream of a mixing tank and a second blending unit installed downstream of the mixing tank. Optionally, the first blending unit comprises a first inlet configured to receive the primary fuel, a second inlet configured to receive the secondary fuel and an outlet configured to direct the fuel emulsion generated by the first blending unit into the mixing tank. Optionally, the second blending unit comprises an inlet for receiving the fuel emulsion from the mixing tank and an outlet configured to direct the fuel emulsion after being processed in the second blending unit to the fuel injection system of the engine.

Alternatively or additionally, the fuel supply system may further comprise a fuel emulsion circuit configured for circulating the fuel emulsion through the fuel supply system and optionally the fuel injection system. The fuel emulsion circuit may comprise a fuel emulsion recirculation line configured to receive unspent fuel emulsion form the fuel injection system and a fuel emulsion supply line configured for supplying the fuel emulsion to the fuel injection system.

Alternatively or additionally, the fuel supply system may further comprise at least one sensor unit configured to determine at least one physical or chemical characteristic of the fuel emulsion, in particular downstream of the at least one blending unit, and a control unit configured to control operation of the at least one blending unit in dependence on the characteristic determined by the at least one sensor unit. Specifically, the characteristic of the fuel emulsion may be indicative of or may be at least one of: density, viscosity, dielectricity, temperature, pressure, flow velocity, mass fraction of the secondary fuel and volume fraction of the secondary fuel. In a further development, the control unit may be configured to control, in dependence on the characteristic determined by the sensor unit, at least one of a supply of the primary fuel to the blending unit and a supply of the secondary fuel to the blending unit.

Industrial Applicability

With reference to the Figures, a fuel supply system of an internal combustion engine is suggested. The fuel supply system as mentioned above is applicable in any suitable internal combustion engine. The suggested fuel supply system unit may replace conventional fuel supply systems and may serve as a replacement or retrofit part.

The invention claimed is:

1. A fuel supply system of an internal combustion engine for supplying a fuel emulsion to a fuel injection system of the engine, the fuel supply system comprising:

a mixing tank;

a first blending unit upstream of the mixing tank;

a second blending unit downstream of the mixing tank;

wherein the first blending unit comprises a first inlet configured to receive a primary fuel, a second inlet configured to receive a secondary fuel, and an outlet configured to direct the fuel emulsion generated by the first blending unit toward the mixing tank; and wherein the second blending unit comprises an inlet for receiving the fuel emulsion from the mixing tank and an outlet configured to direct the fuel emulsion after being processed in the second blending unit toward the fuel injection system of the engine.

2. The fuel supply system according to claim 1, wherein the primary fuel is fuel oil or diesel fuel.

3. The fuel supply system according to claim 1, wherein the secondary fuel is at least one of methanol, ammoniac, liquid natural gas and hydrogen.

4. The fuel supply system according to claim 1, wherein the fuel emulsion provided by the first blending unit and/or the second blending unit comprises a selectable mass fraction of the primary fuel and the secondary fuel of the fuel emulsion, wherein the selectable mass fraction is up to 50% of the secondary fuel.

5. The fuel supply system according to claim 1, wherein the first blending unit and/or the second blending unit comprises an electrically driven actuator.

6. The fuel supply system according to claim 1, wherein the first blending unit and/or the second blending unit is a shearing mixer or an ultrasonic mixer.

7. The fuel supply system according to claim 1, wherein the first blending unit and/or the second blending unit is configured to process the fuel emulsion such that, upon being discharged from the first blending unit and/or the second blending unit, the fuel emulsion has a mean droplet size of dispersed phase which is smaller than 100 μm.

8. The fuel supply system according to claim 1, further comprising a primary fuel supply line for selectively supplying the primary fuel into the first inlet of the first blending unit and a secondary fuel supply line for selectively supplying the secondary fuel into the second inlet of the first blending unit.

9. The fuel supply system according to claim 1, wherein the mixing tank is configured to store the fuel emulsion.

10. The fuel supply system according to claim 1, further comprising a fuel emulsion circuit configured for circulating the fuel emulsion through the fuel supply system and the fuel injection system, wherein the fuel emulsion circuit comprises a fuel emulsion recirculation line configured to receive unspent fuel emulsion from the fuel injection system and a fuel emulsion supply line configured for supplying the fuel emulsion to the fuel injection system.

11. A fuel supply system, of an internal combustion engine for supplying a fuel emulsion to a fuel injection system of the engine, including at least one actuated blending unit configured to blend a primary fuel and a secondary fuel to provide the fuel emulsion prior to being supplied to the fuel injection system, the fuel supply system further comprising at least one sensor unit configured to determine at least one physical or chemical characteristic of the fuel emulsion downstream of the at least one actuated blending unit and a control unit configured to control operation of the at least one actuated blending unit in dependence on the characteristic determined by the at least one sensor unit.

12. The fuel supply system according to claim 11, wherein the characteristic of the fuel emulsion is indicative of or is at least one of: density, viscosity, dielectricity, temperature, pressure, flow velocity, mass fraction of the secondary fuel and volume fraction of the secondary fuel.

13. The fuel supply system according to claim 11, wherein the control unit is configured to control, in dependence on the characteristic determined by the at least one sensor unit, at least one of a supply of the primary fuel to the at least one actuated blending unit and a supply of the secondary fuel to the at least one actuated blending unit.

* * * * *